(12) United States Patent
Lynn et al.

(10) Patent No.: US 8,049,178 B2
(45) Date of Patent: Nov. 1, 2011

(54) SEMICONDUCTIVE MATERIALS AND ASSOCIATED USES THEREOF

(75) Inventors: Kelvin Lynn, Pullman, WA (US); Kelly Jones, Colfax, WA (US); Guido Ciampi, Waltham, MA (US)

(73) Assignee: Washington State University Research Foundation, Pullman, WA (US)

( * ) Notice: Subject to any disclaimer, the term of this patent is extended or adjusted under 35 U.S.C. 154(b) by 76 days.

(21) Appl. No.: 12/202,026

(22) Filed: Aug. 29, 2008

(65) Prior Publication Data
US 2009/0114832 A1 May 7, 2009

Related U.S. Application Data

(60) Provisional application No. 60/968,963, filed on Aug. 30, 2007.

(51) Int. Cl.
*G01T 1/26* (2006.01)
(52) U.S. Cl. ............... 250/371; 250/370.11; 250/361 R
(58) Field of Classification Search .................. 250/371, 250/370.13, 370.11, 361 R
See application file for complete search history.

(56) References Cited

U.S. PATENT DOCUMENTS

| | | | |
|---|---|---|---|
| 3,549,434 | A | 12/1970 | Aven |
| 5,187,116 | A | 2/1993 | Kitagawa et al. |
| 6,080,984 | A * | 6/2000 | Friesenhahn ............ 250/252.1 |
| 6,093,347 | A | 7/2000 | Lynch et al. |
| 2005/0268841 | A1 * | 12/2005 | Szeles et al. ............ 117/81 |
| 2007/0193507 | A1 | 8/2007 | Szeles et al. |
| 2009/0321730 | A1 | 12/2009 | Lynn et al. |

FOREIGN PATENT DOCUMENTS

WO    WO 2005048357 A1 * 5/2005

OTHER PUBLICATIONS

Brunett, B.A., et al., "Fine-Scale Spatial Response of CdZnTe Radiation Detectors," IEEE Transactions on Nuclear Science, vol. 46, No. 3, pp. 237-242, Jun. 1999.
Bushuev, A.V., et al., "Possible Application of γ-Ray Spectrometers Based on CdZnTe Detectors," Atomic Energy, vol. 92, No. 5, pp. 403-407, 2002.
Piotrowski, J., and W. Gawron, "Extension of longwavelength IR photovoltaic detector operation to near room-temperatures," Infrared Physics & Technology, vol. 36, pp. 1045-1051, 1995.
International Search Report and Written Opinion issued Apr. 22, 2009 in International Application No. PCT/US2008/074912.
Biernacki, S. et al., "Electronic properties of A centers in CdTe: A comparison with experiment", Phys. Rev. B 48, 11 726-731 (1993).

(Continued)

*Primary Examiner* — David Porta
*Assistant Examiner* — Jessica L Eley
(74) *Attorney, Agent, or Firm* — China Science Law Group, PLLC

(57) ABSTRACT

High rate radiation detectors are disclosed herein. The detectors include a detector material disposed inside the container, the detector material containing cadmium, tellurium, and zinc, a first dopant containing at least one of aluminum, chlorine, and indium, and a second dopant containing a rare earth metal. The first dopant has a concentration of about 500 to about 20,000 atomic parts per billion, and the second dopant has a concentration of about 200 to about 20,000 atomic parts per billion.

18 Claims, 11 Drawing Sheets

OTHER PUBLICATIONS

Castaldini, A. et al., "Compensation and deep levels in II-VI compounds", Materials Science and Engineering B42, 302-305 (1996).

Hage-Ali, M. et al., Growth Methods of CdTe Nuclear Detector Materials, Semiconductors for Room Temperature Nuclear Detector Applications, T.E. Schlesinger and R.B. James, eds., Academic Press, 1995, pp. 219-222.

Krsmanovic, N. et al., "Electrical compensation in CdTe and $Cd_{0.9}Zn_{0.1}Te$ by intrinsic defects", Phys. Rev. B Rapid Comm. 62, R16 279-282 (2000).

Laks, D.B. et al., "Role of Native Defects in Wide-Band Gap Semiconductors", Phys. Rev. Lett. 66, 648-651 (1991).

Lynn, K.G. et al., "Improved CdZnTe detectors grown by vertical Bridgman process", Mat. Res. Soc. Proc. 484, 319-328 (1998).

Mandel, G., "Self-Compensation Limited Conductivity in Binary Semiconductors. I. Theory", Phys. Rev. 134, A1073-1079 (1964).

Mankoff, D.A. et al., "The Effect of Detector Performance on High Countrate PET Imaging with a Tomograph Based on Position-Sensitive Detectors", IEEE Transactions on Nuclear Science 35, 592-597 (1988).

Neumark, G.F., "Effect of deep levels on semiconductor carrier concentrations in the case of "strong"compensation", Phys. Rev. B 26, 2250-2252 (1982).

Park, C.H. et al., "First-principles study of DX centers in CdTe, ZnTe and $Cd_xZn_{1-x}Te$ alloys", Phys. Rev. B 52, 11 884-890 (1995).

Prener, J.S. et al., "Self-Activation and Coactivation in Zinc Sulfide Phosphors", J. Chem. Phys. 25, 361 (1956).

Rudolph, P. et al. "Attempts to growth of undoped CdTe single crystals with high electrical resistivity", J. Crystal Growth 161, 28-33 (1996).

Rudolph, P. et al., "Basic problems of vertical Bridgman growth of CdTe", Mater. Sci. Eng. B16, 8-16 (1993).

Szeles, Cs. et al., "Trapping properties of cadmium vacancies in $Cd_{1-x}Zn_xTe$", Phys. Rev. B 55, 6945-6949 (1997).

Choe, S-H. et al., "Optical Properties of $CdInGa_{0.96}Er_{0.04}S_4$ Single Crystal," Inst. Phys. Conf. Ser. No. 152: Section D: Optical and Electrical Properties, Paper presented at the 11th Conf. on Ternary and Multinary Compounds, ICTMC-11, Salford, Sep. 8-12, 1997, pp. 681-684.

Office Action issued Dec. 16, 2010 in U.S. Appl. No. 11/910,504, 10 pages.

International Search Report and Written Opinion issued Apr. 17, 2008 in International Application No. PCT/US2007/063330, 7 pages.

Office Action issued May 11, 2010 in Canada Application No. 2,644,536, 3 pages.

* cited by examiner

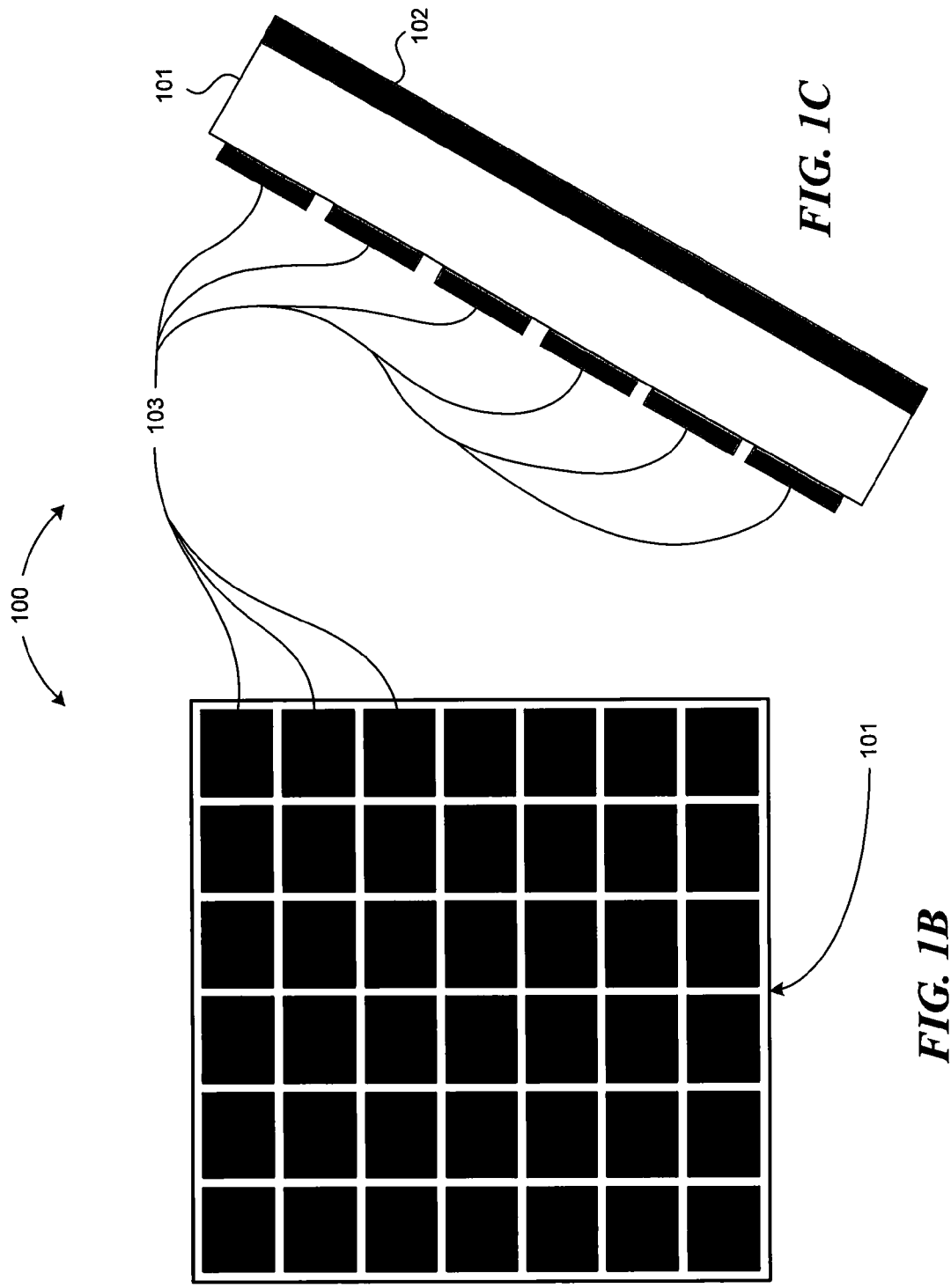

| Row | Bulk Resistivity (Ohm*cm) | $\mu\tau_e$'s (cm$^2$/V) |
|---|---|---|
| G | $1.26 \times 10^{10}$ | $1.05 \times 10^{-3}$ |
| F | $1.68 \times 10^{10}$ | $1.38 \times 10^{-3}$ |
| E | $2.39 \times 10^{10}$ | $1.47 \times 10^{-3}$ |
| D | $3.34 \times 10^{10}$ | $1.67 \times 10^{-3}$ |
| C | $4.18 \times 10^{10}$ | $1.91 \times 10^{-3}$ |
| B | $3.97 \times 10^{10}$ | $1.60 \times 10^{-3}$ |

FIG. 7

SEMICONDUCTIVE MATERIALS AND ASSOCIATED USES THEREOF

CROSS-REFERENCE TO RELATED APPLICATION

The present application claims priority from U.S. Provisional Patent Application No. 60/968,963, filed Aug. 30, 2007, the disclosure of which is incorporated herein by reference in its entirety.

STATEMENT REGARDING FEDERALLY SPONSORED RESEARCH

This work was partially funded by the Department of Energy (DE-FG07-06ID14724), and the United States government has certain rights to this invention.

TECHNICAL FIELD

The present disclosure is related to detectors incorporating materials with appropriate geometric and electronic properties for the detection of high rate radiation.

BACKGROUND

Fundamental physical properties of materials used for radiation detection typically governs the selection of such materials. It is desirable that the materials selected exhibit high electrical resistivity and an excellent ability to transport charge carriers generated by external radiation. It is also desirable that such materials can allow an applied electric field to extend through the whole volume of the crystal (i.e., full depletion). None of these properties can be found in high-purity and intrinsic (i.e., undoped or doped with one dopant element) cadmium-zinc-tellurium ($Cd_{1-x}Zn_xTe$ ($0<x<1$)) grown by known methods.

BRIEF DESCRIPTION OF THE DRAWINGS

FIG. 1B is a schematic top view and FIG. 1C is a schematic cross-sectional view of a pixelated array detector in accordance with another embodiment of the disclosure.

FIG. 7 is an electron mobility-lifetime table of a detector material prepared in accordance with embodiments of the disclosure.

DETAILED DESCRIPTION

Figure 1A:
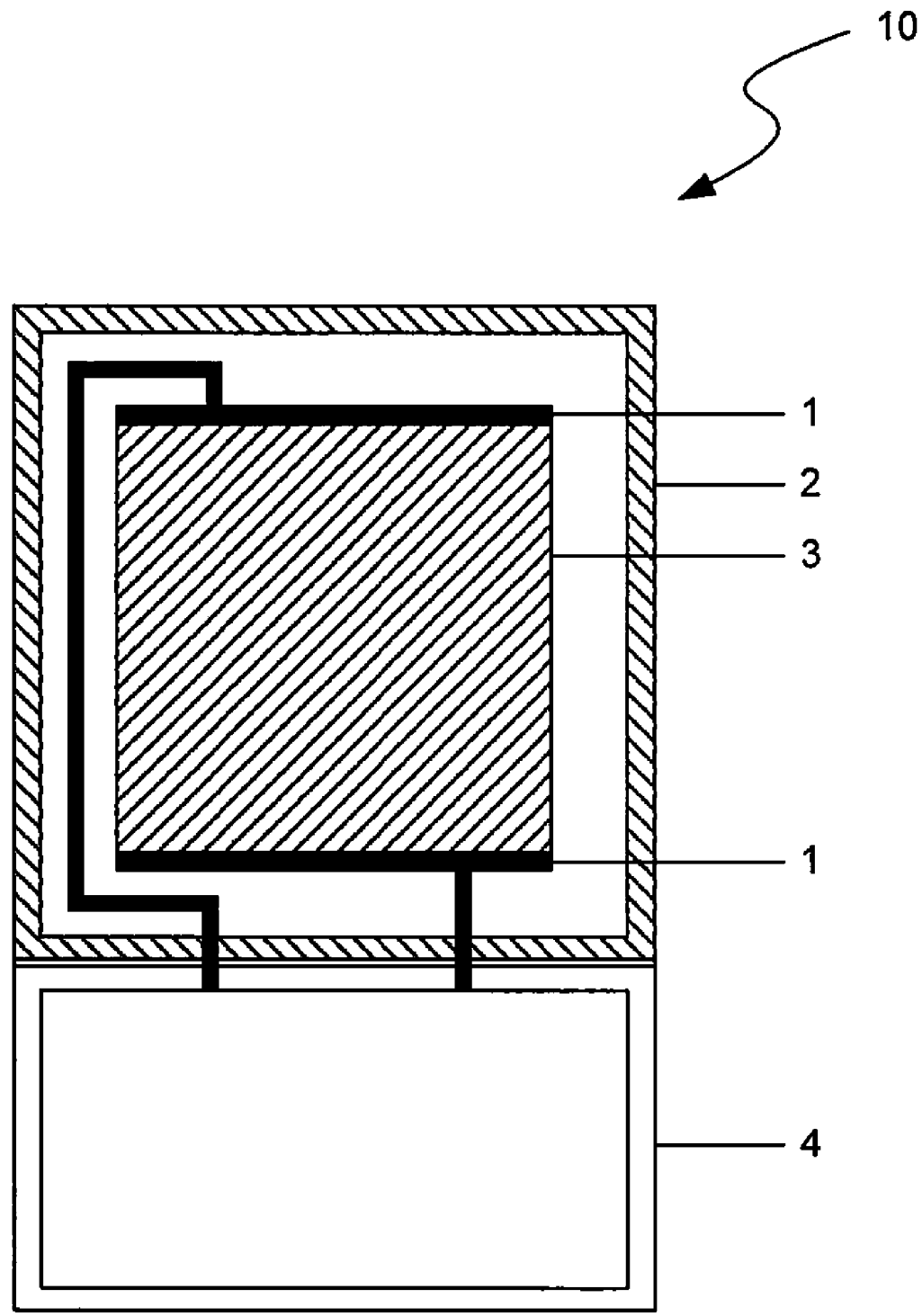
FIG. 1A is a schematic diagram illustrating a detection element in accordance with an embodiment of the disclosure.

The present disclosure describes high rate radiation detectors incorporating a bulk II-VI type detector material containing CdTe, CdZnTe, CdZnSe or CdZnTeSe crystals (collectively referred to herein as CZT). The CZT material may be used in manufacturing solid state, elementary or matrix detectors for detection of gamma or X-ray radiations. It will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the invention. Additionally, the invention can include other embodiments that are within the scope of the claims but are not described in detail with respect to FIGS. 1-9.

A. Detector Materials

In one embodiment, the CZT material includes a bulk II-VI type detector material, a first dopant selected from Group III and/or Group VII of the periodic table, and a rare earth metal. The bulk II-VI type detector material can include elements of Group II (e.g., Cd, Zn) and Group VI (e.g., Te, Se, S) of the periodic table. For example, the bulk II-VI type detector material can include Cd and Zn, with Zn having a concentration of between about 0 and about 20%. When Zn has a concentration of 20%, 1 out of every 5 Cd sites is occupied by a Zn atom. The bulk II-VI type detector material can also include Te and Se, with Se having a concentration of between about 0 and 40%. When Se has a concentration of 20%, 1 out of every 5 Te sites is occupied by a Se atom. The bulk II-VI type detector material can have a Group VI element to Group II element ratio between about 0.9 and about 1.1.

The first dopant can include a Group III element including aluminum (Al), gallium (Ga), and indium (In). The Group III element can have a concentration of about 10 to 20,000 parts per billion (ppb). The first dopant can also include a Group VII element including, chlorine (Cl), bromine (Br), and iodine (I). The Group VII element can have a concentration of at least 10 ppb (e.g., about 10 to about 10,000 ppb). In certain embodiments the first dopant may include a combination of elements from Groups III and VII with a combined concentration of about 10 to about 20,000 ppb.

The second dopant can include a rare earth metal including dysprosium (Dy) and erbium (Er). The rare earth element can have a concentration of at least 10 ppb (e.g., about 10 to about 10,000 ppb). In a particular embodiment, the second dopant includes Er having a concentration of about 10 ppb to about 400,000 ppb. In another particular embodiment, the second dopant includes Er having a concentration of about 15,000 ppb to about 400,000 ppb. In a further particular embodiment, the CZT material includes cadmium, zinc, and tellurium with aluminum as the first dopant and erbium as the second dopant. The aluminum has a concentration of about 10 to about 20,000 ppb, and the erbium has a concentration of about 10 to about 400,000 ppb. In yet a further embodiment, the CZT material includes cadmium, zinc, and tellurium with indium as the first dopant and erbium as the second dopant. The indium has a concentration of about 10 to about 20,000 ppb, and the erbium has a concentration of about 10 to about 400,000 ppb.

B. Compensation Schemes

The present disclosure also describes co-doping (use of two doping elements) or triple doping (use of three doping elements in parallel) compensation schemes for at least partially remedy the intrinsic defects of a high-purity CZT material. The first and second dopants can be selected and introduced to the bulk II-VI type detector material in a controlled way and in quantities appropriate to a particular growth method to reliably produce useful extrinsic (i.e., doped) CZT materials with improved resistivity (semi-insulating) and depletion characteristics.

Embodiments of the compensation schemes can enable the use of individual dopants to achieve full compensation and excellent charge transport in the CZT materials. The first dopant can be an impurity selected from elements in Group III and/or Group VII of the periodic table. The selected first dopant can provide donors and makes A-centers. The second dopant (e.g., a rare earth element) can passivate the intrinsic deep level defects to enable full depletion of the devices. Optionally, a third element can be used as a deep level dopant that secures full electrical compensation to control the resistivity.

Embodiments of this arrangement at least reduces the adverse effects of the common single doping schemes on the carrier transport properties of the CZT materials through the use of large concentrations of compensating doping elements. It is believed that the high concentration of dopants in the single-dopant schemes mask the effects of the intrinsic deep level defects without passivating them, thereby causing incomplete depletion of the detectors and space charge build up during operation of the device and the collapse of the internal electric field in the radiation detector, commonly called as polarization.

In one embodiment, a particular compensation scheme can include selecting a first dopant having an element from Group III and/or Group VII of the periodic table to improve resistivity of the CZT materials. Without being bound by theory, it is believed that undoped CZT materials can vary in resistivity due to native defects, such as cadmium vacancies, dislocations, and intrinsic deep level defects incorporated to the material during crystal growth. Some of these crystal defects can be ionized at ambient temperature to provide a supply of free charge carriers (electrons or holes) resulting in low-resistivity. It is believed that a Group III and/or Group VII element can occupy the sites normally occupied by elements from Group II or Group VI in the CZT material, and so vacancies, antisites, and/or other defects can be reduced. For example, Group III elements (e.g., Al, Ga, In) and/or Group VII elements (e.g., Cl, Br, I) can combine with the cadmium vacancies to form impurity-vacancy pairs commonly known and referred to as A-centers. In this process, the energy level of the cadmium vacancy defect can be shifted to the lower energy level of the A center. The lower energy level reduces the residency time of charge carriers (holes) at the defect and improves the carrier transport property of the CZT material.

However, the CZT materials doped with an element of Group III and/or Group VII typically cannot achieve full depletion and can be polarized in operation because other Group VI related intrinsic defects can result in charge trapping. For example, formation of deep level defects from intrinsic or native defects in sufficient concentrations can produce crystals that cannot be fully depleted by an external bias voltage. As a result, the charge transport properties of the CZT material are reduced. Thus, selecting a second dopant to provide new carrier pathways through the CZT material and/or through structural perturbation of the Group VI related defects can reduce such charge trapping.

The second dopant can be selected to include a rare earth metal element based on whether the formation energy (e.g., enthalpy and/or entropy of formation) of a Group II and/or Group VI element and the rare earth metal is above a threshold sufficient to maintain the element-Group II and/or element Group VI complex throughout the crystal growth process. In a particular example, Er is selected as the second dopant because Er can react with Te to form Er—Te complexes. The reaction can have a large heat of formation, and Er can irreversibly combine with Te while in a liquid phase, the product of which may form solid domains that can remain intact during subsequent cooling to be integrated into the bulk CZT material. It is believed that this interaction can decrease the frequency of intrinsic defects and intrinsic defects related to the Group VI element in the CZT material.

The second dopant (e.g., Er, Dy) can have a concentration of at least 10 atomic parts per billion. In some embodiments, the Er concentration can be about 10 to about 400,000 atomic parts per billion. In further embodiments, the Er can have a molar concentration that is generally similar to that of tellurium in the CZT material. Surprisingly, high doping levels can limit the spatial variations within grown ingots.

Typically, conventional techniques do not use such a high doping concentration because a number of factors pose practical limitations on the useful range of dopant concentrations. Major factors include both solubility and utility provided by any given dopant element. It is believed that there are limits to the solubility of an element within a liquefied mixture of Group II and Group VI elements. The limited solubility in turn restricts the potential dopant range. Additionally, the maximum and minimum dopant levels that can provide useful materials can vary with the specific electronic properties of the dopant. In particular, for dopants that impart positive or beneficial properties to the material (e.g., to increase resistivity or charge carrier transport ability), there is typically a doping level over which the dopant begins to impart adverse effects on the utility of the material. Generally, once a doping level exceeds this critical value, the dopant can act as charge trap and diminish the charge carrier transport ability of the material. With these restrictions, doping practice common to the art typically utilizes doping levels of between 10-10,000 ppb to avoid degradation of the desired material properties.

The compensation scheme described above can result in improved accuracy in predicting whether incorporating a particular second dopant would yield a useful material. Conventional techniques for selecting the second dopant generally involve a comparison of the electronic properties between the selected second dopant and the Group II and/or Group VI elements in the CZT material. Typically, the second dopant is selected to pin the Fermi level at a midpoint between the energy levels of the valance band and the conduction band. However, such a technique does not provide adequate information relating to the resulting solid state electronic properties and the interaction between the second dopant and the Group II and Group VI elements. As a result, in many cases, there is little information available for accurate prediction of whether incorporating the second dopant would yield a useful material. Thus, the selection criterion based on formation energy discussed above can at least provide a general guide for choosing a second dopant that might yield useful materials.

Materials with full depletion have optimal charge transport properties. Specifically, fully depleted materials can transport both "holes" (positive charges) and "electrons" (negative charges). This property enables a more rapid equilibration of charges after the perturbation of charge associated with the detection of a photon. The net result is a material with a rapid refresh rate, which allows for said material to be applied as a detector in applications requiring a rapid, repetitive detection (e.g. medical imaging and time resolved imaging), high count rates (e.g. detection of nuclear material), and/or continuous irradiation (e.g. solar energy capture). Full depletion further provides materials with improved thermal stability and thus enables the semiconductor material to be exposed to temperatures in excess of 50° C. (e.g. remote sensing, food inspection, integration with consumer electronics).

Drawbacks associated with conventional doping schemes for high-count-rate applications include loss of resolution, spectral distortion, excessively long counting times, inaccurate counting statistics, or even system shutdown due to overload and saturation. High count rates are desired for faster analysis, more information, improved signal to noise ratio, and a larger dynamic range and need to be performed accurately and quickly to maximize efficiency. To increase the speed of the analysis is to simply increase the incident photon rate or counts per second. Detectors that can analyze the photons faster can increase production and efficiency enabling new uses for CZT based materials in high rate detection applications. Large detectors are also desirable to measure more photons per second if the detector's thickness is not adequately large enough to stop all incident photons. Ultimately, high rates are dependent on how fast the detector can equilibrate the incident charge. Conventional doping schemes do not consistently provide CZT that can be grown in large volumes with adequate electronic uniformity and material properties. As a result, such CZT materials only have limited utility in applications requiring high count rates and thermal stability.

Compensating for Group VI element related defects and larger volume defects (e.g., precipitation and inclusion) utilizing the compensation schemes described herein limits the spatial variations within grown ingots. With fewer defects, a larger active area can be realized to enable applications that require large detectors. Moreover, dopant combinations that minimize Group VI element related defects and provide full depletion have particular utility in devices that have a large detector size and a high detection rate requirement. Several embodiments of the co-doping compensation schemes in accordance with this disclosure are useful for producing large and generally fully depleted semiconductor materials that useful in applications requiring spectral or spatial information and high count rates. The ability to capture spectral and/or spatial information requires a pixilation of the semiconductor materials. In one embodiment, a large single crystal of a co-doped Group II-VI material with little or no spatial variation in electronic properties is pixelated to yield a detector capable of capturing and transmitting incident radiations. Pixelation generally refers to an implementation in which a CZT crystal is partitioned to yield segmented detectors capable of providing spatial and/or spectral information. While the particularities of an application typically dictate the nature and extent of spectral or spatial dispersion of photon-based information, the prerequisite of a nearly uniform semiconductor material that enables pixilation such that the pixel response is nearly uniform across the material is property consistency. Several embodiments of the co-doping compensation schemes in accordance with this disclosure provide a unique approach to enable the production of Group II-VI materials with large sizes and little spatial variation in material electronic properties.

Several embodiments of the co-doping compensation schemes in accordance with the present disclosure can also be useful for producing fully depleted materials that can be used in applications that require high count rates and thick detectors. Examples of high rate applications include but are not limited to gamma and/or X-ray imaging methods for medical computed tomography and baggage scanning, nuclear monitoring, high rate x-ray fluorescence, macro defect analysis, food inspection, container filling, and/or other suitable high rate applications. As used herein, "high rate" or "high count rate" generally refers to a rate at which photons are incident upon a surface of a semiconductor material in excess of about 50,000 counts per second. However, the photon count rate is related to the thickness of the material. For example, thin crystals typically allow for higher count rates. In certain applications thick detectors may be preferred; for example, in applications with an intense photon source (e.g. homeland security applications and medical imaging). Therefore, a material that has a rapid refresh rate and can be grown into large uniform crystals are of particular utility.

Cadmium-tellurium semiconductor materials have been used to capture solar energy. Such materials are capable of utilizing the visible spectrum to generate photocurrent with efficiencies similar to silicon-based solar cells. However, cadmium-tellurium cells are not subject to the degradative processes of silicon-based cells. According to conventional techniques, such cadmium-tellurium-based photovoltaic materials have similar shortcomings as do the CZT-based detector materials, i.e., intrinsic material defects may limit charge mobility and decrease overall production of photocurrent. The lifetime is less of a problem in solar energy applications because photo-generated electron hole pairs need to travel a shorter distance (e.g., about 100 microns) in photovoltaic applications. However, CZT-based materials with enhanced lifetimes can enhance efficiency for solar energy conversion.

A particular embodiment of the invention provides a solar cell containing a CZT material having a bulk II-VI type detector material, a first dopant selected from Group III and/or Group VII of the periodic table, and a rare earth metal. The bulk II-VI type detector material can include elements from Group II (e.g., Cd, Zn) and Group VI (e.g., Te, Se, S) of the periodic table. For example, the bulk II-VI type detector material can include Cd and Zn with a Zn concentration of between about 0 and about 20%. When Zn has a concentration of 20%, 1 out of every 5 Cd sites is occupied by a Zn atom. The bulk II-VI type detector material can also include Te and Se with a Se concentration of between about 0 and 40%. When Se has a concentration of 20%, 1 out of every 5 Te sites is occupied by a Se atom. The bulk II-VI type detector material can have a Group VI element to Group II element ratio between about 0.9 and about 1.1. The CZT materials described herein can be grown through any of the numerous growth methods known in the art.

The first dopant can include a Group III element including aluminum (Al), gallium (Ga), and indium (In). The Group III element can have a concentration of about 10 to 20,000 ppb. The first dopant can also include a Group VII element including chlorine (Cl), bromine (Br), and iodine (I). The Group VII element can have a concentration of at least 10 ppb (e.g., about 10 to about 20,000 ppb). In certain embodiments, the first dopant may comprise a combination of elements selected from Groups III and VII with a combined concentration of about 10 to about 20,000 ppb.

The second dopant can include a rare earth metal including dysprosium (Dy) and erbium (Er). The rare earth element can have a concentration of at least 10 ppb (e.g., about 10 to about 10,000 ppb). In a particular embodiment, the second dopant includes Er having a concentration of about 10 ppb to about 400,000 ppb. In another particular embodiment, the second dopant includes Er having a concentration of about 15,000 ppb to about 400,000 ppb. In a further particular embodiment, the CZT material includes cadmium, zinc, and tellurium with aluminum as the first dopant and erbium as the second dopant. The aluminum has a concentration of about 10 to about 20,000 ppb, and the erbium has a concentration of about 10 to about 400,000 ppb. In a further particular embodiment, the CZT material includes cadmium, zinc, and tellurium with indium as the first dopant and erbium as the second dopant. The indium has a concentration of about 10 to about 10,000 ppb, and the erbium has a concentration of about 10 to about 400,000 ppb.

In particular embodiments the co-doped II-VI materials is ground into a powder or paste mixed with and adhesion medium and deposited onto a substrate surface. The adhesion medium is then removed (e.g. heating, chemical treatment) and contacts are placed onto the deposited co-doped II-VI material. In the preferred embodiment the contacts comprise a transparent semiconductor material of differing type (P or N) such that the combination of co-doped II-VI material and contact form what is generally referred to in the art as a PIN junction. Lastly the combined co-doped II-VI material and contact are covered with an antireflective coating to enhance photon capture.

CZT materials prepared according to the compensation schemes described above can result in large CdZnTe crystals with spatial uniformity, improved carrier transport properties, and/or optimal depletion characteristics that can be used as detector materials for high rate detection applications requiring high energy resolutions. Conventional high-purity intrinsic CdZnTe compounds typically show low electrical resistivity due to intrinsic or native defects. It is believed that such defects can include cadmium (Cd) vacancies in tellurium (Te) rich growth conditions or cadmium interstitials in cadmium rich growth conditions. In addition, an intrinsic defect is that Te antisite complexes can form, often in large concentrations, a deep electronic level at the middle of the band gap. This intrinsic defect can produce high electrical resistivity but prevents full depletion of the device when the defect is present in significant concentrations. Unknown impurities and/or other native defects can also render the intrinsic CdZnTe compounds to have strong carrier trapping tendencies, thereby deteriorating a radiation detector's performance. When impurities, native defects, and their associations are incorporated in an uncontrolled manner, the properties of the CdZnTe compounds can vary from growth to growth and exhibit strong spatial variations within the ingots. As a result, conventional CZT materials is typically less than about 1 mm thick due to lack of fully active volumes, depletion region, or poor charge carrier lifetimes. Devices containing such conventional CZT materials are limited to low rate photon fluxes of 50,000 cps or less because of the poor charge carrier lifetimes/active volumes that can lead to polarization of the material. In contrast, materials prepared according to embodiments of the current disclosure can have large charge carrier lifetimes (for both holes and electrons) resulting in higher rates and volumes. The co-dopant, Er also decreases the variance in material performance due to the large dopant range and can yield high quality materials with large charge carrier lifetimes over conventional doping schemes. The ability to utilize co-dopant concentrations significantly higher than those commonly utilized in the art (e.g., 50-2000 ppb) is surprising and enabling for the growth of large CZT crystals with little variance in material performance. This provides materials that, when pixelated, at least 95% of the pixels are capable of producing an electrical response upon exposure to a photon source producing photons at a rate of greater than 50,000 Hz.

The term "large" in reference to CZT crystals is application specific. For linear bar scanners used in applications such as baggage scanning, food inspection, bone densitometry, large CZT crystals of 2×16×1 mm are currently utilized, while in applications where large area mapping is desirable, multiple large single CTZ crystals of about 20×20×1 mm in size are combined to generate images. The ability to utilize fewer crystals per unit area provides a particular advantage because it simplifies the device electronics, provides better resolution and higher quality images. Thus large, as used herein, generally refers to CZT crystals that meet or exceed in area and/or volume of the CZT crystals that are currently utilized in a particular detection application. In most imaging applications, it is believed that superior device performance can be realized through the use of CZT crystals with a larger area and volume.

Conventional compensation schemes are typically utilized to mitigate the adverse properties associated with high-purity intrinsic CdZnTe and related materials. Generally two types of compensation schemes are employed in the art. First, doping the group II/VI material with a group III and/or group VII element material which can occupy sites within the bulk normally occupied by elements from group II or Group VI and increase the resistivity. However, materials doped with group III and/or group VII are typically not fully active (i.e. full depletion) because of other group VI related intrinsic defects that result in charge trapping thereby diminishing the charge transport properties of the medium. As a result, a secondary dopant is often employed to compensate for the adverse effects of charge trapping by creating alternative carrier pathways through the medium and/or through structural perturbation of the group VI related defects.

The selection of a secondary dopant element generally involves an assessment of how the electronic properties of the selected element compare to those of the selected elements from groups II and VI. Optimally, the selected element will compensate intrinsic Te complexes and act to have the Fermi level at the approximate midpoint between the energetic levels of the valance band and the conduction band. However, such compensation can cause charge trapping that degrades the properties of the detector. The current state of the art has not identified optimal secondary dopants due at least in part to a lack of comprehensive understanding of the electronic properties of the individual elements and the resulting solid state electronic properties deriving from the interaction of such elements with those from groups II and VI. As a result in many cases there is little information available that will enable the accurate prediction of what secondary dopant will yield a useful material.

Despite extensive investigation into the development of compensation schemes intrinsic defects, unknown impurities and other native defects conspire to impose practical limitations on the use of CdZnTe and related materials within detector applications. The strong spatial variations introduced by such defects/impurities impart non-uniform electronic properties throughout the material. This results in significant limitations for the use of these materials in applications where large 1 mm thick or greater detectors are desirable. For example, detecting high energy gamma and x-rays radiations with high efficiency requires large active volumes of detecting materials. Employing highly controlled growth conditions and appropriate compensation schemes, CdZnTe and related materials of 1 mm thick or greater in size with uniform electronic properties can be consistently generated for use in detection applications.

C. Detector for High Rate Radiation

CZT materials are useful for imaging applications because of their high atomic density, atomic number (Z), and the ability to form a solid state device that operates at room temperatures. A solid state device can directly convert incident radiation into electrical charge with high resolution and efficiency. Conventional compensation schemes and growth methods are unable to consistently provide fully depleted CZT materials of sufficient sizes for use in applications requiring a high rate of detection. The compensation schemes of the present disclosure can provide generally fully depleted CZT materials with sufficient thickness (e.g. >1 mm) for use in applications requiring a high detection rate. Such CZT materials can provide improved resolution and/or dynamic range.

FIG. 1A is a schematic diagram illustrating a detection element 10 in accordance with an embodiment of the disclosure. As illustrated in FIG. 1A, the detection element 10 can include an active CZT material 3 operable to provide an electrical responses when a photon is incident on the surface of the CZT material 3. The detection element 10 can also include metal electrodes 1 that are in contact with the CZT material 3 and operable to apply bias and/or to relay the electrical responses generated by the CZT material 3. The metal electrodes 1 may be connected to the CZT material 3 by a conductive path or other suitable mechanisms to transfer an electrical response. In certain embodiments, the CZT material 3 is further connected to a control circuitry (e.g. having electrical circuits via bonding techniques, not shown) to control the applied electrical bias and any additional parameters required for the measurement.

The detection element 1 can also include a preamplifier or digitizer 4 in electrical contact with the metal electrodes 1 and operable to record, to filter and/or to amplify the electrical responses. A wide variety of patterned electrodes/detector material orientations are possible to maximize the detector output, including but not limited to, pixilated, guard rings, steering grids, drift detectors, and single carrier type implementations. A surface passivation technique can also be employed.

As illustrated in FIG. 1A, the detector element 10 is a single element. However, the detector element 10 may be a single component within a larger array of CZT based detector elements. Larger array's may have individual preamps or digitizers per pixel. Array and pixel size would be application specific and encompass various areas with thicknesses of about 1 mm or greater. Irrespective of the electrode/detector material arrangement, the material is operated in darkness, preferably enclosed within a conductive container 2 that is operable to at least reduce external electromagnetic radiation. In certain embodiments, the container 2 is composed of low Z material to allow gamma and x-rays to pass through.

The CZT materials produced employing the compensation schemes disclosed herein can be integrated into an apparatus suitable for the detection of high rate gamma and/or X-ray radiation for the evaluation/imaging of internal components of an object. In particular embodiments, the apparatus may serve to monitor radiation output (e.g. nuclear monitoring) while in other embodiments the apparatus may generate images or spectral information from components internal to an object (e.g. methods for medical computed tomography and baggage scanning, high rate x-ray fluorescence, macro defect analysis, food inspection, and container filling). A specific embodiment having the CZT materials prepared according to the compensation schemes disclosed herein can be a device for integrated computed tomography: a medical imaging method/apparatus employing digital geometry processing used to generate a three-dimensional image of the internals of an object from a series of two-dimensional x-ray images taken around a single axis of rotation. In other embodiments, the CZT materials prepared according to the compensation schemes disclosed herein can be integrated into photovoltaic devices to provide devices with enhanced efficiency.

A photon source can generate x-rays by applying a high voltage to the photon source (e.g., a x-ray tube). In general, high rate applications require a CPS of greater than 50,000 to maximize efficiency. The photons generated at the source are directed toward a sample with optics, or other methods for the direction of high energy photons. The sample is positioned such that the photons are incident on the sample. How the photons are incident on the sample depends on the application. After the photons have passed through/interacted with the sample, they are directed (and/or focused and/or dispersed) to the detector which generated an electrical response that is reflective of perturbations to the intensity and/or spectral distribution of the photons incident on the detector. Detector, sample, and source size and source composition all affect the specific arrangement and necessary photon guiding/focusing aspects.

FIG. 1B is a schematic top view and FIG. 1C is a schematic cross-sectional view of a pixelated array detector 100 in accordance with an embodiment of the disclosure. Referring to FIG. 1B and FIG. 1C together, the pixelated array detector 100 can include a CZT crystal 101 in electrical connection with a conductive cathode 102 and an array of conductive anodes 103 opposite the cathode 102. The CZT crystal 101 can be co-doped according to several embodiments of the methods described above. The anodes 103 can be arranged in an array defining pixels of the detector array. The number, size, spatial layout, and/or positioning of the anodes 103 can vary depending on the intended application. Some applications may have only a single pixel (e.g. implementations requiring only intensity readings) while other applications may require a linear pixel array (e.g. those requiring both intensity and spectral information and/or those requiring only 1-D spatial information). Yet further applications may require a 2D array of pixels (e.g. those applications requiring 2D spatial information or those requiring both spatial and spectral information).

Figure 1D:
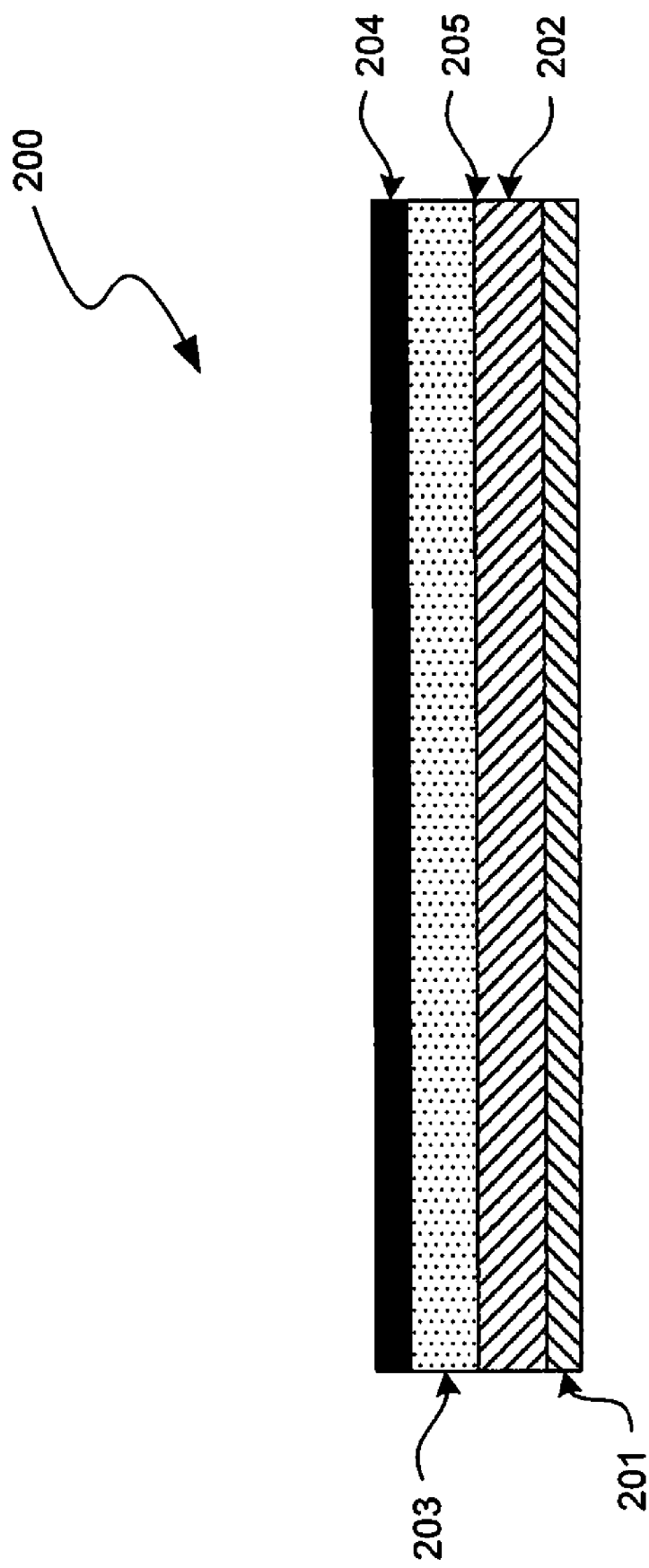
FIG. 1D is a schematic diagram illustrating a photovoltaic device in accordance with a further embodiment of the disclosure.

FIG. 1D is a schematic diagram illustrating a photovoltaic device 200 in accordance with a further embodiment of the disclosure. As shown in FIG. 1D, the photovoltaic device 200 can include a substrate material 201 upon which a layer of co-doped CZT material 202 is deposited. A contact layer 203 is in electrical communication with the CZT material 202. The contact layer 203 can include a different semiconductor type than the CZT material 202. For example, in a particular embodiment, the CZT material 202 is a P-type, and the contact layer 203 is an N-type semiconductor. In other embodiments, the co-doped CZT material 202 may be N-type, and the contact layer 203 may be P-type. The photovoltaic device 200 thus forms a PN junction in which "P" refers to a P-type semiconductor; "N" refers to an N-type semiconductor. Other embodiment may include an intrinsic region, 205, situated between the N and P-type semiconductors to provide a PIN junction in which at least one of the layers 202, 203 and 205 comprise a co-doped CZT material as described herein. Optionally, the photovoltaic device 200 can include an antireflective coating 204 on top of the contact layer 203. The anti-reflective coating 204 can be configured to trap incident photons.

EXAMPLES

During preparation of a charge, in accordance with some embodiments, a few degrees of freedom are allowed in the progression of runs and include the quantity and type of the dopant. Concentrations of chosen dopants are added to the growth. The results of the prepared charges are reflected in the examples below. It is to be understood that any CZT crystal growth method known in the art may be employed to generate the CZT materials described herein.

Crystal Growth of Doped Materials

The co-doped charge, which contains Cd, Zn, and Te with a slight excess Te, was loaded into a crucible. Excess Te varied from about 0 to about 3.5% and Zn concentration was about 10%. The charge was prepared in a clean room. The crucible was placed in a quartz ampoule, or the crucible was the quartz ampoule deposited with a graphite layer and placed under vacuum. In most growths, a partial pressure of a gas was introduced, and the ampoule container was sealed with a quartz end cap. The ampoule was then placed in a modified vertical Bridgman furnace and grown over the period of approximately 12.5 days.

Material Characterization

Grown ingots are subject to a variety of tests and measurements. Glow Discharge Mass Spectroscopy (GDMS) was performed at three sections in the ingot for determining dopant and impurity concentrations. Samples from the shoulder, mid, and heel are sent to the GDMS lab (National Resource, Canada) to be tested. Also, samples 1×1×0.2 cm were taken approximately along the vertical axis of the ingot. Samples were polished and deposited with gold contacts for electrical measurements. First current-voltage analysis was performed to determine bulk resistivity, thermo-electric effects spectroscopy (TEES), and Gamma spectroscopy was performed to measure the detector response to ionizing radiation and $\mu\tau$ (mobility*lifetime) measurement for electrons and sometimes holes to determine charge carrier properties. $\mu\tau$ products were determined by the Hecht relation assuming a uniform electric field and homogenous material:

$$Q = Q_O \frac{\mu_\theta \tau_\theta E}{Th}\left[1 - \exp\left(\frac{-Th}{\mu_\theta \tau_\theta E}\right)\right] + \frac{\mu_h \tau_h E}{Th}\left[1 - \exp\left(\frac{-Th}{\mu_h \tau_h E}\right)\right]$$

The equation can be reduced to a single carrier by generating charge close to a single contact as follows:

$$Q = Q_O * \frac{\mu\tau * E}{Th} * \left(1 - \exp\left(\frac{-Th}{\mu\tau * E}\right)\right)$$

where Q is the charge collection (peak centroid), $Q_o$ is the maximum collectible charge, $\mu\tau$ is the mobility*lifetime, E is the applied electric field, Th is the thickness of the sample.

Figure 2:
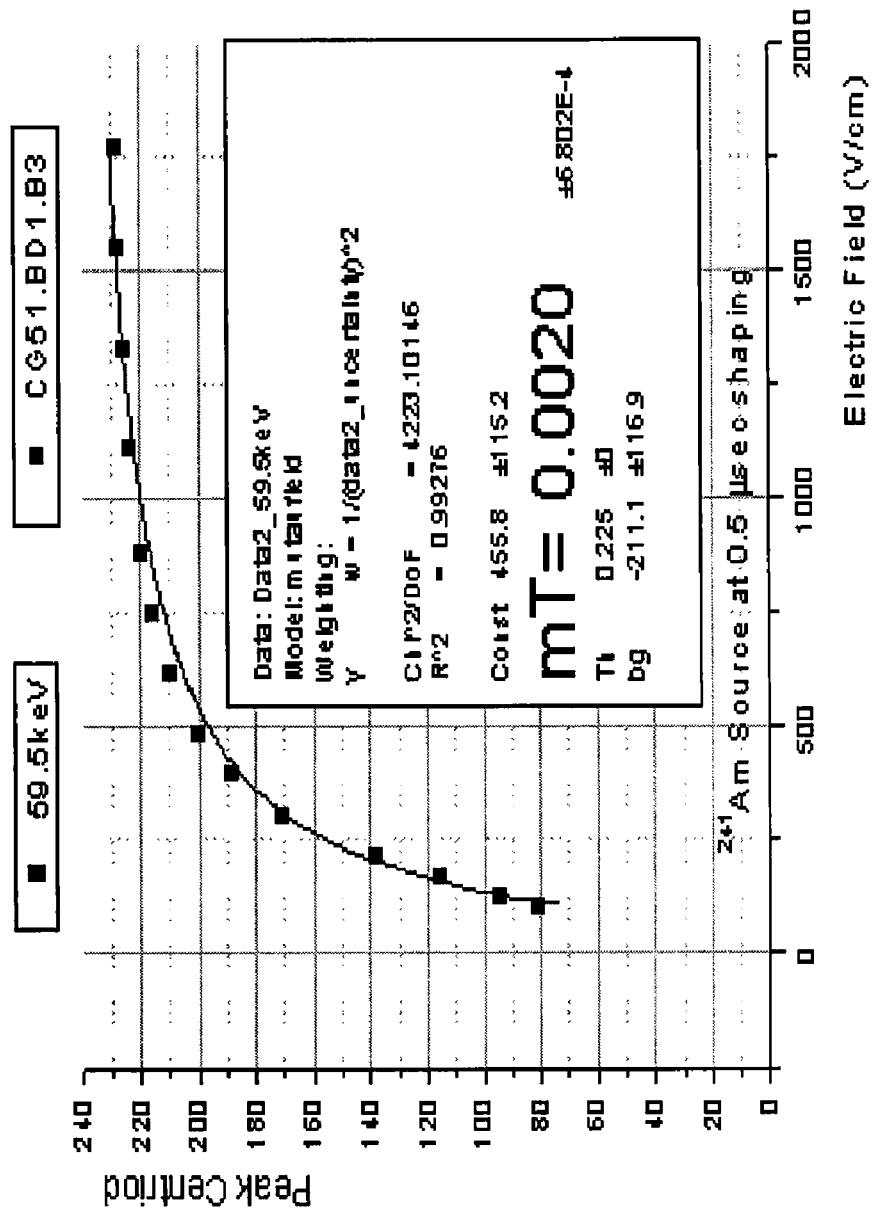
FIG. 2 is an electric field versus peak centroid diagram of a detector material prepared in accordance with embodiments of the disclosure.
Figure 4:
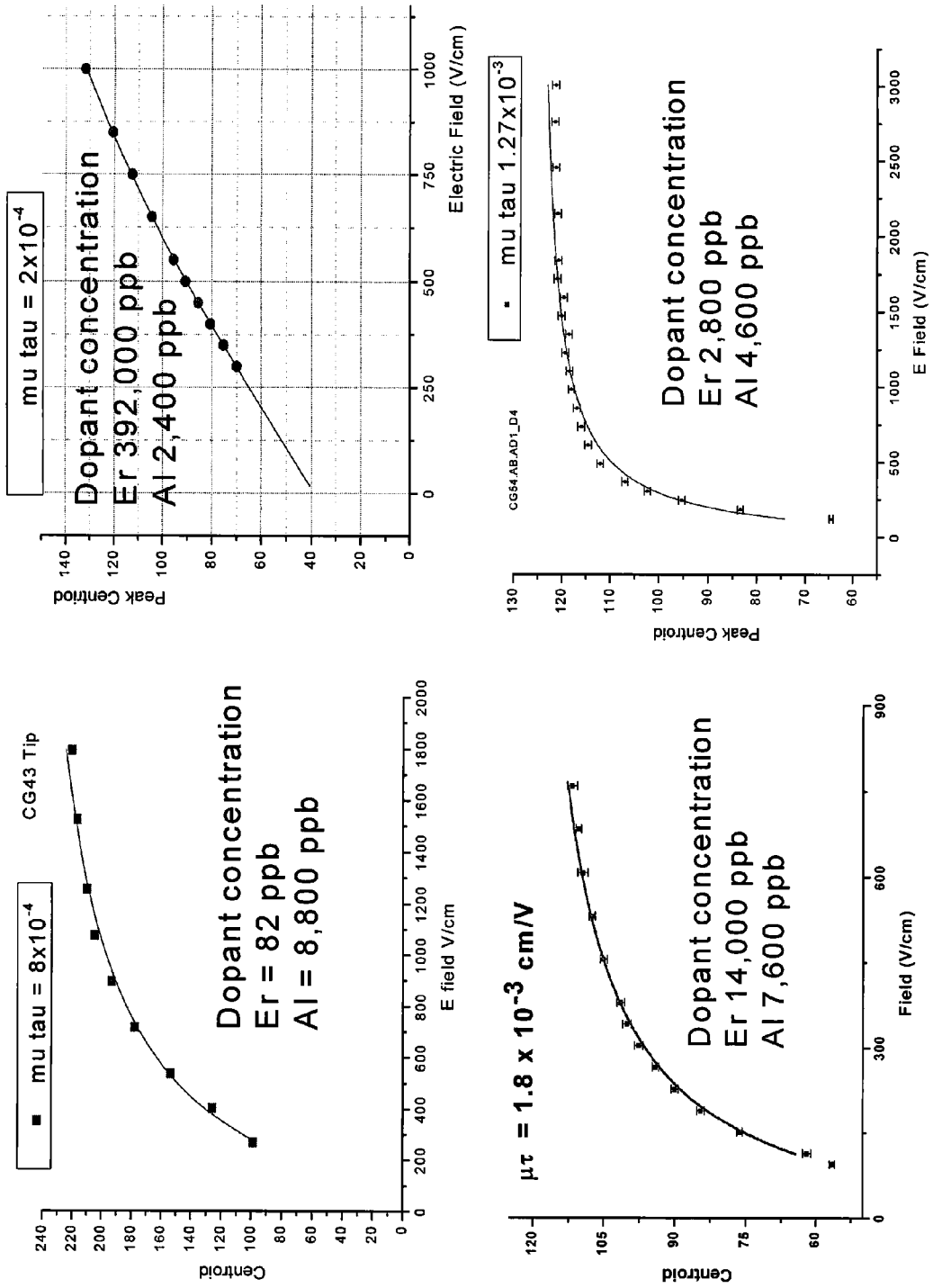
FIG. 4 is a set of electron mobility-lifetime diagram of a detector material prepared in accordance with embodiments of the disclosure.

For electron characterization, a $^{241}$Am or $^{137}$Cs source was positioned facing the cathode end of the detector. Plotting the peak centroid position of the 59.5 keV or 32 keV line on the y-axis and the applied electric field on the x, the Hecht relation was fitted to the foregoing equation. The $\mu\tau$ product for several samples are shown in FIGS. 2 and 4.

Physical Characterization of the Material, Where Er was Co-Dopant:

CZT undoped has typically low resistivity primarily as a result of defects in the cadmium vacancy. A group III or VII dopant can compensate such defects and likely would increase the resistivity of the material. This compensation technique creates an A-center and does not produce intrinsic characteristics or fully active regions of the material. The introduction of a second dopant, Erbium, does compensate remaining defects creating a fully active material. (FIGS. 2-8 and Table 1) This combination of dopants results in high resistivity, and large charge carrier mobility and lifetimes. The properties of large electron and hole mobility and lifetimes throughout the bulk of the material create fully active material, suitable for solid state radiation detectors. Elemental compositions as measured by glow discharge mass spectrometry are provided in Table 1 below, which shows data of the average (derived from sampling from the shoulder, mid, and heel) ingot dopant concentrations with resulting average ingot electrical properties.

TABLE 1

Representative crystal growths co-doping with Erbium. Average values over range of ingots

| Er (ppb) | Al (ppb) | Cl (ppb) | In (ppb) | $\mu\tau$ PRODUCT ($cm^2/V$) | Resistivity (Ohm * cm) |
|---|---|---|---|---|---|
| 7,600 | 8,500 | | | 5.60E−04 | 1.80E+10 |
| 440 | 2,933 | | | 4.06E−04 | 1.98E+10 |
| 1,017 | 7,267 | | | 4.72E−04 | 2.80E+10 |
| 3,400 | 6,433 | | | 1.03E−03 | 1.88E+10 |
| 400 | 1,480 | 585 | | 9.90E−04 | 2.10E+10 |
| 2,667 | 18,600 | 2,346 | | 1.74E−03 | 9.70E+9 |
| 204,110 | | | | 2.74E−04 | 1.10E+10 |
| 122,333 | 2,433 | | 1,310 | 2.82E−04 | 9.43E+9 |
| 7,400 | | | 11,000 | 7.50E−04 | 1.65E+10 |
| 2,450 | | | 9,400 | 1.00E−03 | 2.04E+10 |
| 1,533 | | | 8,733 | 2.08E−03 | 1.33E+10 |
| 24,433 | | | 15,900 | 1.30E−03 | 1.88E+10 |
| 1,723 | | | 4,267 | 1.72E−03 | 2.35E+10 |
| 1,833 | | | 4,700 | 1.45E−03 | 2.96E+10 |
| 1,633 | | | 3,800 | 1.50E−03 | 2.80E+10 |

$\mu\tau$ is the product of $\mu$=mobility and $\tau$=lifetime. The product of these two properties was a common method to quantify the material. The larger the $\mu\tau$ value the larger the lifetimes. Fully active material for 1 mm thick has a large $\mu\tau$ value>$1\times10^{-4}$ $cm^2/V$.

Figure 3:
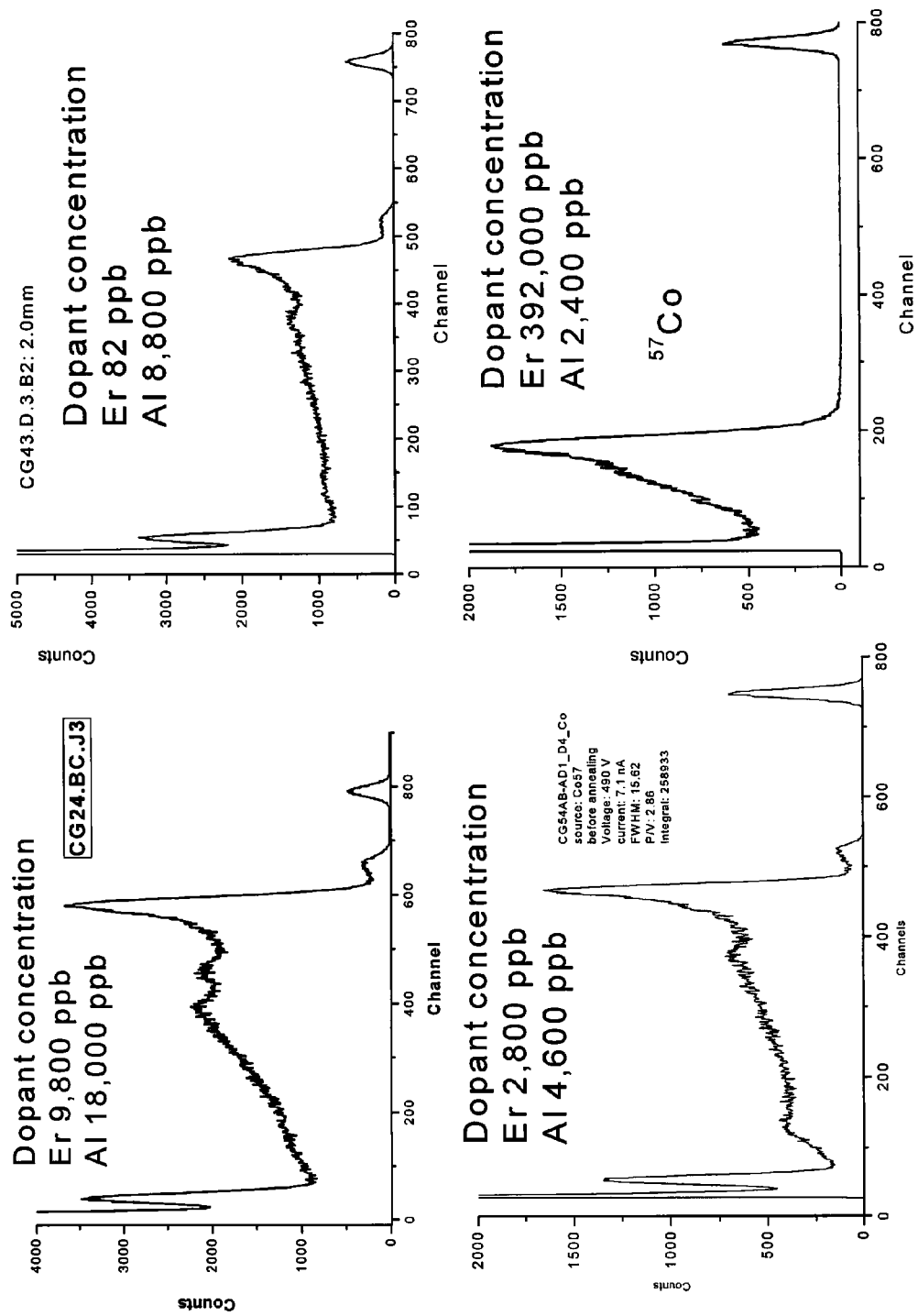
FIG. 3 is a set of gamma or x-ray spectroscopy measurement diagrams of a detector material prepared in accordance with embodiments of the disclosure.
Figure 5:
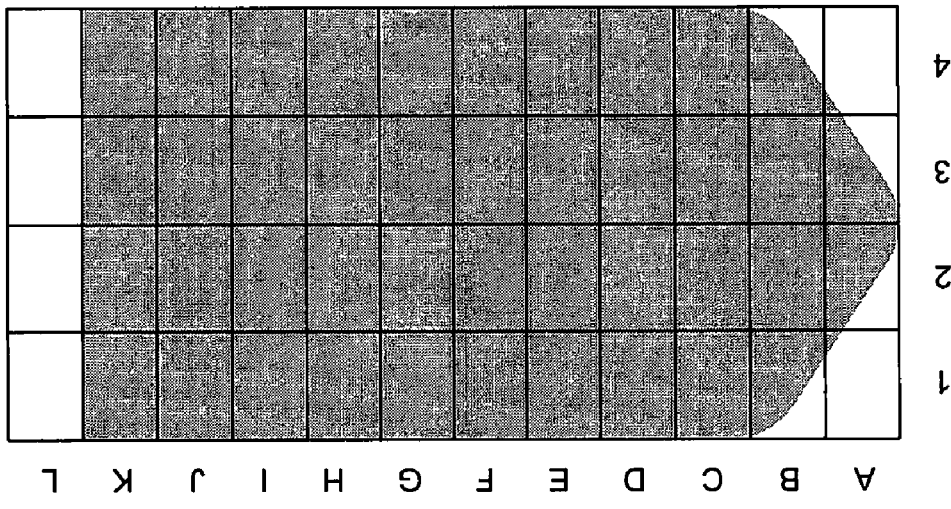
FIG. 5 is a set of spatial resistivity diagram of a detector material prepared in accordance with embodiments of the disclosure.
Figure 6:
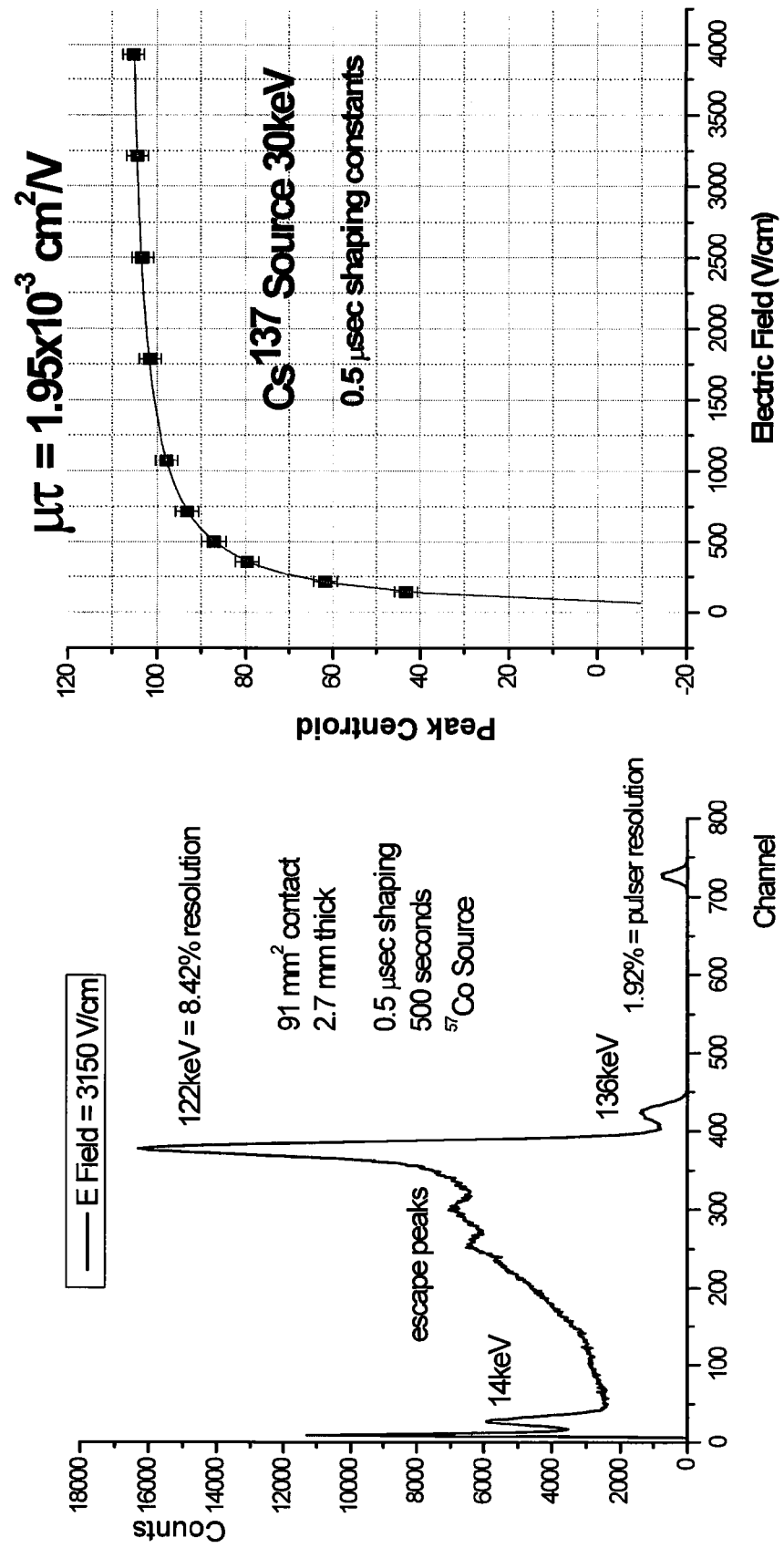
FIG. 6 is a set of gamma spectroscopy measurements of a detector material prepared in accordance with embodiments of the disclosure.
Figure 8:
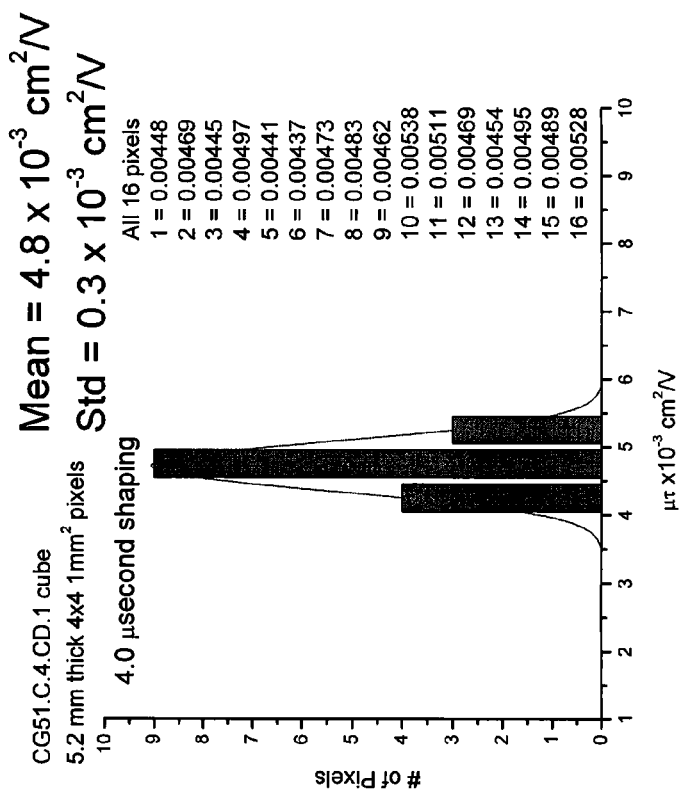
FIG. 8 is a set of gamma spectroscopy results and electron mobility-lifetime measurements from a pixelated detector constructed from a detector material prepared in accordance with embodiments of the disclosure.
Figure 8:
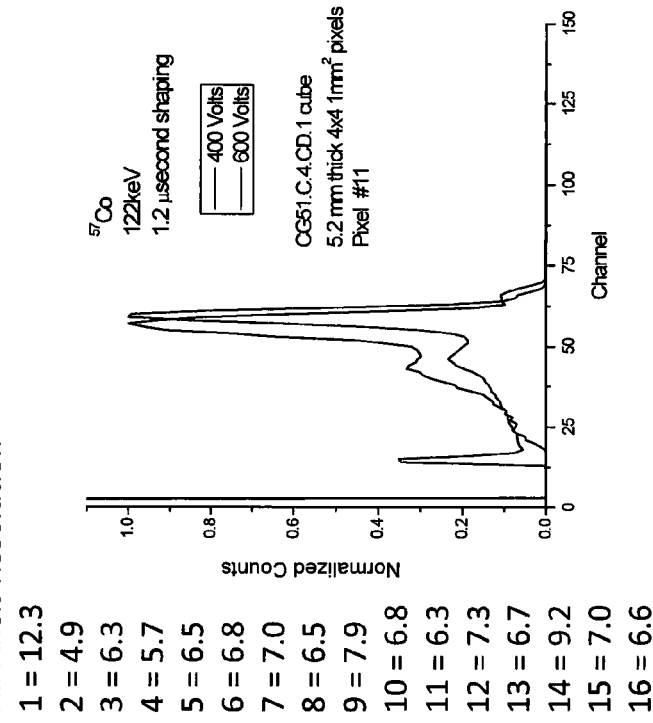
Figure 8:
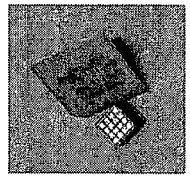

Gamma spectroscopy was performed on samples cut from grown ingots. Numerous samples have a resolution and efficiency similar to the commercially available CdZnTe detectors. Examples are shown in FIG. 3 with various dopant concentrations. FIG. 3 and FIG. 6 show sets of gamma or x-ray spectroscopy measurement diagrams of samples. FIG. 5 shows a set of spatial resistivity diagram of samples. FIG. 8 shows a set of gamma spectroscopy results and electron mobility-lifetime measurements from a pixelated detector constructed from a detector material sample.

Electron mobility multiplied by the lifetime of the charge carrier was calculated from grown samples. The product was calculated by fitting the Hecht relation. FIG. 4 shows results from four ingots with various dopant concentrations. FIG. 7 shows an electron mobility-lifetime table of a detector material sample prepared in accordance with embodiments of the disclosure.

Trapping levels associated with cadmium vacancies, tellurium anti-sites and their complexes were identified using thermo-electrical effect spectroscopy in CdTe and CdZnTe crystals grown by the vertical and high pressure Bridgman techniques. The corresponding thermal ionization energies, which were extracted using initial rise and/or variable heating rate methods and first principles calculations are at E1=0.09±0.01, E2=0.12±0.01 eV, E3=0.18±0.01 eV, E4=0.23±0.01 eV, E5=0.36±0.01 eV, E6=0.79±0.08 eV, E7=0.39±0.01 eV, and E8=0.31±0.01 eV. Based on the first principles method calculation of transition energies (thermal ionization energies), purity data from glow discharge mass spectroscopy, and growth conditions of the crystals trapping levels have been determined.

Trapping levels were identified at E2 and E4 with the first and second ionized state of the isolated cadmium vacancy, E1 and E3 to the first and second ionized state to cadmium vacancy-isoelectronic oxygen complex. Other levels assigned were E5 with tellurium antisite-divacancy, E6 with tellurium anti-site-single vacancy complex, E7 with tellurium antisite-cadmium vacancy-donor in the cadmium site complex and E8 with tellurium antisite-cadmium vacancy. The latter complex acts as a donor. These energies can vary depending on the Zn concentration.

Er Doped CZT as Detector Material for High Rate Applications

Figure 9:
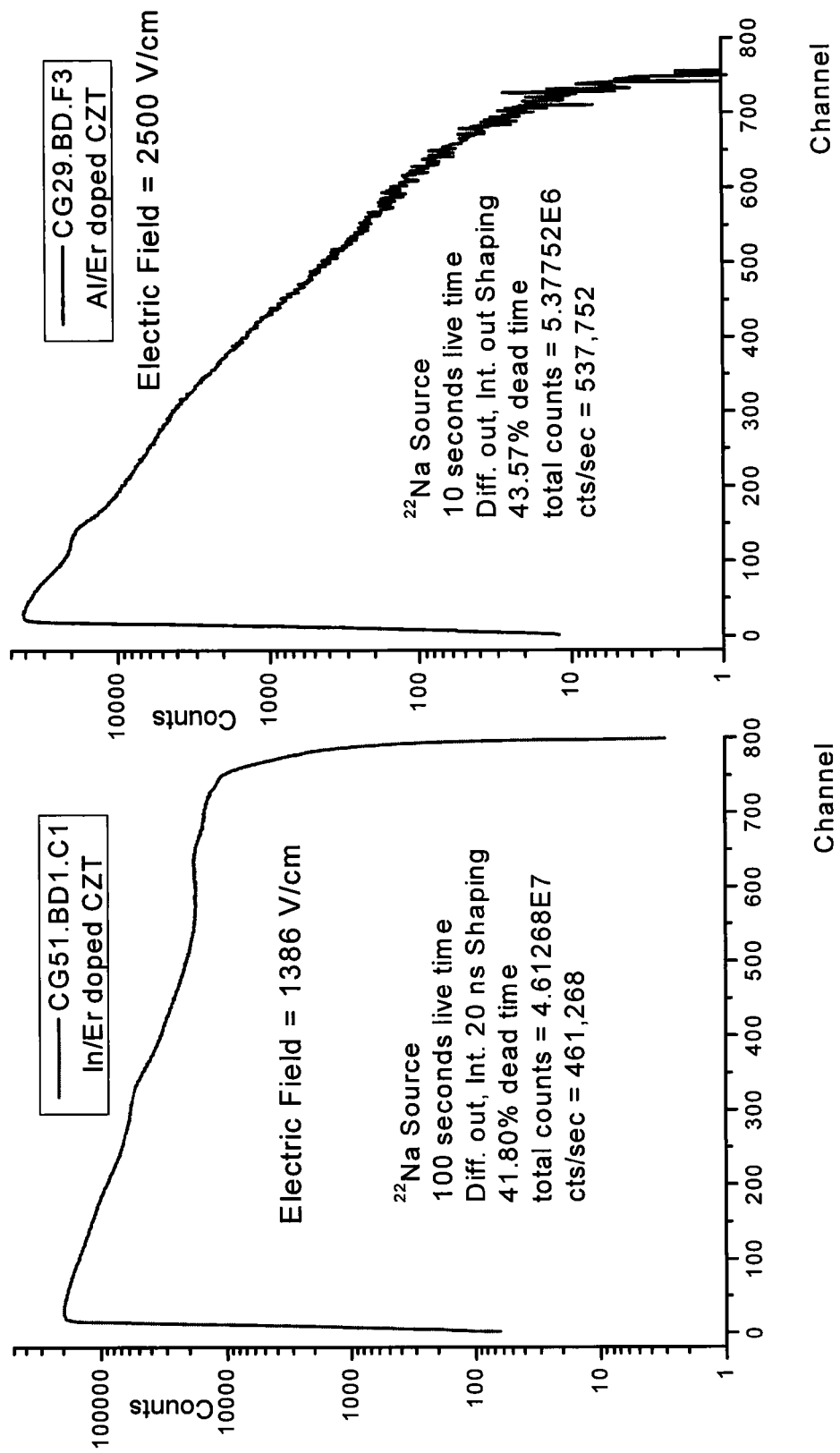
FIG. 9 are a set of count response diagrams for a CZT-type detector material prepared in accordance with embodiments of the disclosure.

A CZT material of about 2 mm thick detectors were connected to several electrical components in a Multi-Channel Analyzer (MCA). The gamma radiation source was a $^{22}$Na, which emits a 1274.5 keV gamma and a positron, which is believed to annihilate and emit two 511 keV gamma rays. Due to the detector's thickness, the detector is believed to detect predominately the 511 keV gamma rays. The MCA and electronics included a modified 550 preamplifier, Ortec 579 fast filter amplifier, Canberra 8077 fast Analog to Digital Converter (ADC), Geneie 2000 Software on a Dell PC, and Ortec 210 High Voltage Supply. Approximately 450 Volts was applied to the detectors and the $^{22}$Na source (creating a large number of carriers when placed 1 to 2 cm away). Data were collected for 100 or 10 seconds (life time). The results in FIG. 9 show at approximately 0.5 million counts per second, the responses were digitized in both detectors without polarizing. However the real count rate was much higher. The large percent dead time indicates many more events or counts were actually accruing in the detectors than the ADC can count.

From the foregoing, it will be appreciated that specific embodiments of the disclosure have been described herein for purposes of illustration, but that various modifications may be made without deviating from the disclosure. For example, many of the members of one embodiment may be combined with other embodiments in addition to or in lieu of the members of the other embodiments. Accordingly, the disclosure is not limited except as by the appended claims.

We claim:

1. A method for high rate detection of radiation, comprising:
   exposing a detector material to photons in excess of 50,000 counts per second, wherein the detector material includes at least one element from Group II of the periodic table, at least one element from Group VI of the periodic table, a first dopant containing at least one element from Group III or Group VII of the periodic table, and a second dopant containing erbium (Er) having a concentration of about 10 atomic parts per billion to about 400,000 parts per billion;
   detecting a distribution of the photons with the detector material; and
   applying a bias to the detector material to provide an electrical response corresponding to the detected distribution of the photons.

2. The method of claim 1 wherein the distribution of the photons is spatial.

3. The method of claim 1 wherein the distribution of the photons is spectral.

4. The method of claim 1 wherein the second dopant includes erbium (Er) at a concentration of about 15,000 parts per billion to about 400,000 parts per billion.

5. The method of claim 1 wherein the second dopant includes erbium (Er) at a concentration of about 15,000 parts per billion to about 200,000 parts per billion.

6. The method of claim 1 wherein the first dopant includes at least one of aluminum, indium, and chlorine.

7. A radiation detector, comprising:
   a container configured to at least reduce external electromagnetic radiation; and
   a detector material disposed inside the container, the detector material containing at least one element from Group II of the periodic table, at least one element from Group VI of the periodic table, a first dopant containing at least one element from Group III or Group VII of the periodic table, and a second dopant containing erbium (Er) having a concentration of about 15,000 atomic parts per billion to about 400,000 parts per billion.

8. The radiation detector of claim 7 wherein the second dopant includes erbium (Er) at a concentration of about 15,000 parts per billion to about 200,000 parts per billion.

9. The radiation detector of claim 8 wherein the second dopant includes erbium (Er) with a concentration of about 15,000 parts per billion to about 100,000 parts per billion.

10. A photovoltaic device, comprising:
    a substrate layer;
    a contact layer opposite the substrate layer; and
    a detector layer disposed between the substrate layer and the contact layer, the detector layer containing at least one element from Group II of the periodic table, at least one element from Group VI of the periodic table, a first dopant containing at least one element from Group III or Group VII of the periodic table, and a second dopant containing at least one of dysprosium and erbium having a concentration about 15,000 atomic parts per billion to about 400,000 parts per billion.

11. The photovoltaic device of claim 10 wherein:
    the at least one element from Group II of the periodic table includes at least one of cadmium and zinc;
    the at least one element from Group VI of the periodic table includes at least one of selenium and tellurium;
    the first dopant includes at least one of aluminum, gallium, indium, chlorine, bromine, and iodine; and
    the second dopant includes erbium.

12. The photovoltaic device of claim 10 wherein:
    the at least one element from Group II of the periodic table includes cadmium and zinc;
    the at least one element from Group VI of the periodic table includes tellurium;
    the first dopant includes chlorine; and
    the second dopant includes erbium with a concentration of about 15,000 to about 200,000 parts per billion.

13. The photovoltaic device of claim 10 wherein:
    the at least one element from Group II of the periodic table includes cadmium and zinc;
    the at least one element from Group VI of the periodic table includes tellurium;
    the first dopant includes chlorine; and
    the second dopant includes erbium at a concentration of about 15,000 to about 100,000 parts per billion.

14. The photovoltaic device of claim 10 wherein:
the at least one element from Group II of the periodic table includes cadmium and zinc;
the at least one element from Group VI of the periodic table includes tellurium;
the first dopant includes chlorine; and
the second dopant includes erbium at a concentration of about 20,000 parts per billion.

15. The photovoltaic device of claim 10 wherein the detector layer consists essentially of cadmium and zinc, tellurium, aluminum, and erbium.

16. The photovoltaic device of claim 10 wherein the detector layer consists essentially of cadmium and zinc, tellurium, chlorine, and erbium.

17. The photovoltaic device of claim 10 wherein the detector layer consists essentially of cadmium and zinc, tellurium, indium, and erbium.

18. The photovoltaic device of claim 10 wherein the detector layer consists essentially of cadmium and zinc, tellurium, aluminum, chlorine, and erbium.

* * * * *